United States Patent Office 3,182,042
Patented May 4, 1965

3,182,042

POLYMERIZABLE FURANSULFONIC ACID COMPOUNDS AND POLYMERS THEREOF

Edward M. La Combe and Walter P. Miller, Charleston, W. Va., assignors to Union Carbide Corporation, a corporation of New York No Drawing. Filed June 12, 1962, Ser. No. 201,767
11 Claims. (Cl. 260—79.3)

The present invention relates in important part to the production of novel polymerizable organic compounds, and is especially concerned in this regard with the production of polymerizable furansulfonic acid compounds, including both the free sulfonic acids and the alkali metal sulfonate derivatives thereof. The invention is also concerned with novel, normally solid polymers of said polymerizable furansulfonic acid compounds, including both homopolymers thereof, as well as heteropolymers, such as terpolymers, quadripolymers, graft polymers, etc., containing in polymerized form, acrylonitrile, vinyl chloride and a minor proportion of at least one polymerizable furansulfonic acid of this invention.

More particularly, the polymerizable furansulfonic acid compounds of this invention can be represented by the general formula (I)

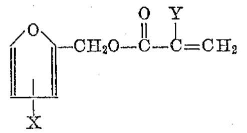

wherein X designates a sulfo (—$SO_3H$) or metallosulfo (—$SO_3M$) radical, M being a metal atom, and preferably an alkali metal atom, as for instance, a lithium, sodium, potassium, rubidium or cesium atom, etc., of which an alkali metal atom having an atomic number of from 3 to 19, i.e., a lithium, sodium, or potassium atom is especially preferred; and Y designates a hydrogen or chlorine atom, or a methyl radical.

As more specifically illustrative of the polymerizable furansulfonic acid compounds represented above by Formula I, there can be mentioned:

2-(acryloxymethyl)furan-3-sulfonic acid,
Sodium 2-(acryloxymethyl)furan-3-sulfonate,
2-(acryloxymethyl)furan-4-sulfonic acid,
Lithium 2-(acryloxymethyl)furan-4-sulfonate,
2-(acryloxymethyl)furan-5-sulfonic acid,
Potassium 2-(acryloxymethyl)furan-5-sulfonate,
2-(alpha-methacryloxymethyl)furan-3-sulfonic acid,
Sodium 2-(alpha-methacryloxymethyl)furan-3-sulfonate,
2-(alpha-methacryloxymethyl)furan-4-sulfonic acid,
Lithium 2-(alpha-methacryloxymethyl)furan-4-sulfonate,
2-(alpha-methacryloxymethyl)furan-5-sulfonic acid,
Potassium 2-(alpha-methacryloxymethyl)furan-5-sulfonate,
2-(alpha-chloroacryloxymethyl)furan-3-sulfonic acid,
Sodium 2-(alpha-chloroacryloxymethyl)furan-3-sulfonate,
2-(alpha-chloroacryloxymethyl)furan-4-sulfonic acid,
Lithium 2-(alpha-chloroacryloxymethyl)furan-4-sulfonate,
2-(alpha-chloroacryloxymethyl)furan-5-sulfonic acid, and
Potassium 2-(alpha-chloroacryloxymethyl)furan-5-sulfonate.

The furansulfonic acid compounds of this invention can be produced by various methods, which it is to be noted, in no way limit the invention. Such compounds can, for instance, be obtained by steps which include the sulfonation of a member of a known class of compounds, viz., the 2-(acryloxymethyl)furan compounds, including the methacryloxy and chloroacryloxy derivatives thereof, represented by the formula (II)

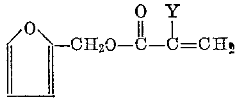

wherein Y is as defined above, such as 2-(acryloxymethyl)furan, 2-(alpha-chloroacryloxymethyl)furan, and 2-(alpha-methacryloxymethyl)furan.

The 2-(acryloxymethyl)furan compound represented above by Formula II can initially be obtained, for instance, by the conventional transesterification of furfuryl alcohol with an alkyl ester of either acrylic-, alpha-methacrylic-, or alpha-chloroacrylic acid.

The conversion of the 2-(acryloxymethyl)furan compound to the corresponding ring-substituted sulfonic acid derivative represented above by Formula I wherein X designates the sulfo radical, is readily carried out. Thus, for example, the 2-(acryloxymethyl)furan compound can be sulfonated by reaction with a mild sulfonating agent comprised of a mixture of sulfuric acid and acetic anhydride, at a temperature of from about −15° C. to about +25° C., and preferably from about −10° C. to about +10° C. for a period of time sufficient to produce a sulfonated derivative. Reaction periods of up to about 24 hours can best be employed in this regard, with the lower reaction temperatures and shorter reaction periods being especially preferred.

The unsulfonated 2-(acryloxymethyl)furan compound is best introduced to the sulfonating agent in solution, using, by way of illustration, an inert solven such as methylene dichloride, ethylene dichloride, ethyl acetate, acetic acid, or the like. A polymerization inhibitor, such as hydroquinone etc., is also desirably incorporated in the reaction mixture.

The mole ratio of sulfuric acid to acetic anhydride in the sulfonating agent can vary from about 0.1:1 to about 1:1, with a mole ratio of from about 0.1:1 to about 0.6:1 being preferred. The mole ratio of sulfuric acid to the unsulfonated 2-(acryloxymethyl)furan compound can vary from about 1:1 to about 3:1 with a mole ratio of from about 1:1 to about 1.2:1 being preferred. Additional acetic anhydride can also serve as a solvent.

Produced as hereinabove described, the free furansulfonic acid can be recovered from the crude reaction product, if desired, in any convenient manner, such as by the esterification of the carboxyl groups present (from the acetic anhydride component of the sulfonating agent) using a suitable alcohol such as methanol, followed by the distillation of both the resulting acetate and excess alcohol. Alternatively, the free furansulfonic acid can be recovered after esterification by crystallization and filtration, preferably subsequent to the distillation of the acetate. Moreover, while the furan-5-sulfonic acid derivatives are most readily produced, other furan-ar-sulfonic acid derivatives are also often formed, or can be obtained, by varying the sulfonation reaction in a manner determinable by those skilled in the art in light of this disclosure.

The free furansulfonic acid can thereafter be reacted with an alkali metal hydroxide or alkoxide, or an alkali metal salt of an acid weaker than sulfonic acid, such as acetic acid or benzoic acid, etc., to form the corresponding alkali metal sulfonate salt. Preferably, such a reaction is carried out in an alcoholic or aqueous solution and at a temperature of from about 5° C. to about 110° C., and preferably from about 20° C. to about 80° C.

The mole ratio of alkali metal hydroxide, alkoxide, or salt to the free furansulfonic acid can vary from about 1:1 to about 10:1, with a mole ratio of from about 1:1 to about 3:1 being preferred. The alkali metal sulfonate thus produced can subsequently be recovered in any convenient manner, such as by filtration, or as the residue product obtained upon evaporation of any solvent present, etc. Moreover, while reference is made herein to the use of alkali metal hydroxides, alkoxides, and salts, similar compounds of other metals can also be employed so as to produce the corresponding metal sulfonate.

The furansulfonic acid compounds of this invention can be polymerized alone or with one or more monomers which are copolymerizable therewith to form normally solid homopolymers and heteropolymers thereof which, in turn, can be used to produce films, as protective coatings, as ion exchange resins, etc. In particular, it has been found that normally solid polymers containing, in polymerized form, acrylonitrile, vinyl chloride and a minor proportion of one or more of the furansulfonic acid compounds of this invention are especially useful in the production of films and modacrylic textile fibers having an improved dyeability and softening and melting point, as well as other improved physical properties. As employed herein, the term "normally solid" is intended to define the physical state of the polymers of this invention under standard conditions of temperature and pressure.

Polymers containing acrylonitrile and vinyl chloride either as the sole polymerized monomers, or polymerized together with minor amounts of other monomers, such as vinylidine chloride, etc., are well known in the art. However, such polymers are ordinarily difficult to dye, and most often, do not have sufficient dye affinity to enable dyeing by the conventional dyeing techniques. In many instances, the dyes so applied are not light-fast or stable to laundering and dry-cleaning operations. In addition, the softening point of the polymers is ordinarily decreased to some extent by the presence of the vinyl chloride or other non-acrylonitrile component, as compared with the softening point of polyacrylonitrile.

It has now been found that polymers especially suitable for use in the production of high-softening, dyeable films and modacrylic textile fibers are those containing in the polymer molecule from about 35 to about 75 percent by weight of polymerized acrylonitrile, from about 10 to about 60 percent by weight of vinyl chloride, and from about 0.5 to about 10 percent by weight of a polymerized furansulfonic acid compound of this invention, wherein the sum of all the copolymerized monomers is 100 percent. In addition, the polymers of this invention can contain one or more additional polymerized monomers, as for instance, vinylidene chloride, vinyl acetate, or the like, at concentrations ranging from about 5 to 20 percent by weight. In a preferred embodiment of this invention the proportion of polymerized acrylonitrile in the polymer molecule is from about 60 to about 75 percent by weight; of polymerized vinyl chloride, from about 20 to about 39 percent by weight, and of the polymerized furansulfonic acid compound, from about 1 to about 5 percent by weight, the sum of the copolymerized monomers again being 100 percent. Moreover, the preferred furansulfonic acid compounds for use in this regard are the metal sulfonate derivatives represented above by Formula I wherein X designates a metallosulfo radical, and of these, the alkali metal sulfonate derivatives are especially preferred.

In addition, conventional modacrylic fiber-forming polymers, containing from about 35 to about 75 percent by weight of polymerized acrylonitrile, together with one or more copolymerized monomers in proportions as hereinabove described, can be blended with or grafted to one or more of the solid homopolymers of this invention, such that the resulting polymer blend or graft polymer contains from about 0.5 to about 10 percent by weight of a polymerized furansulfonic acid compound of this invention. The resulting polymer blend or graft polymer can in turn also be employed to produce films and fibers evidencing improved dyeability, etc.

The polymers of this invention are readily produced at temperatures of from about 25° C. to about 70° C. by any of the usual polymerization processes. Thus, by way of illustration, bulk polymerization can be employed in which the monomers are mixed together with a polymerization catalyst and reacted at a temperature at which polymerization will occur. Emulsion and suspension polymerization processes can also be employed. These latter processes, as is known, are carried out in aqueous medium and generally employ free-radical-type polymerization catalysts, together with emulsifying or dispersing agents. Alternatively, solution polymerization can instead be used, in which case the monomers are dissolved in a suitable solvent and polymerized in contact with a polymerization catalyst. The catalysts employed are the conventional polymerization catalysts known in the art, such as the alkali metal persulfates, the peroxides, the alkali metal bisulfites, azo compounds, such as azodiisobutyronitrile, and the like.

Among the emulsifying and dispersing agents which can be used there can be mentioned the common soaps, such as potassium stearate, potassium palmitate, potassium laurate, etc.; the sulfonated hydrocarbons, such as sulfonated alkanes, sulfonated alkylbenzenes, sulfonated naphthalenes, etc.; the amine soaps, such as the salts of triethanolamine; the salts of formaldehyde-condensed alkylaryl sulfonic acids; sulfonated succinic esters; and the like.

Suitable solvents include, for example, acetone, acetonitrile, N,N-dimethylformamide, N,N-dimethylacetamide, dimethyl sulfoxide, and the like. In some instances, the presence of a small amount of water may also be desirable to aid solution. Moreover, up to about one percent or more of a chain terminator, as for instance, tertiary dodecyl mercaptan, 2-mercaptoethanol, thiourea, or the like, can also be added to the polymerization reaction mixture, if desired, to assist in regulating the molecular weight of the resulting polymer.

During the polymerization, a constant ratio of the monomers is preferably maintained in the reaction mixture by the intermittent addition of the various monomers as needed to achieve polymer uniformity. After the polymerization is complete the polymer is recovered and dried by conventional procedures. Either before or after recovery, one can add pigmenting agents, light stabilizers, heat stabilizers, oxidation inhibitors, etc., to the polymer.

The polymers of this invention are readily soluble in the conventional solvents used in fiber spinning operation, such as, for example, acetone, acetonitrile, N,N-dimethylformamide, N,N-dimethylacetamide, gamma-butyrolactone, ethylene carbonate, ethylene carbamate, N-methyl-2-pyrrolidone, and the like, or mixtures thereof. As is known in the art, the solubility of a particular polymer in a solvent depends on the molecular weight of the polymer, the amount of each monomer polymerized therein, and the uniformity of the polymer. Fibers can then be produced by conventional wet- or dry-spinning techniques. After stretching the fibers to orient the molecules and develop the desired tensile properties, and heat-treating the fibers to improve their properties, the fibers produced from the polymers of this invention can be employed in the many applications in which modacrylic fibers are generally employed. During the fiber-forming operations, small amounts of various stabilizers can be added in order to stabilize the spinning solution and/or fibers against decomposition by heat, light, or oxidation. Illustrative of such stabilizers are the organic tin and lead salts of carboxylic acids, such as dibutyl tin dimaleate, and the like. Alternatively, the polymer solutions can be used to cast films suitable for use as packaging and coatings.

The average molecular weights of the polymers of this invention can be determined by their specific viscosities, which vary in the range of from about 0.1 to about 0.6, and preferably from about 0.2 to about 0.5, when measured at a temperature of 20° C. from an N,N-dimethylformamide solution of the polymer. These values are determined using a size 100 Ubbelhode viscosimeter, and are calculated in accordance with the following formula:

$$\text{Specific viscosity}=\left[\frac{\text{Viscosity of a solution of 0.2 grams of resin in 100 ml. of N,N-dimethylformamide}}{\text{Viscosity of N,N-dimethylformamide}}\right]-1$$

The fibers and films produced from the polymers of this invention are readily dyed by conventional dyeing techniques with a wide variety of dyestuffs to produce highly colored fibers of desirable properties. The fibers are dyed to deeper shades and absorb more dye from the dyebath than do the modacrylic fibers produced from similar acrylonitrile- and vinyl chloride-containing polymers exclusive of the furansulfonic acid compound. Moreover, this improvement in dyeability is attainable even without the use of dye-assistants, such as a swelling agent, in the dyebath. The fibers and films produced from the polymers of this invention also have good wet- and dry-tensile strengths and elongations, good flexibility, elasticity and resilience, as well as resistance to water and various chemical agents including acids and dilute alkalies, and to bacterial and fungal growths.

That the polymers of this invention are more readily dyed, and dyed to deeper shades, is apparent from visual observation and comparison. A quantitative measurement of the amount of dyestuff absorbed is also available, as determined by the following procedure. A piece of dyed and scoured film or fabric prepared from the polymer, weighing about 0.2 gram after drying, is dissolved in 50 milliliters of N,N-dimethylformamide containing 0.25 milliliter of acetic acid. The transmission of this solution at the appropriate wave-length is measured using a Beckman Model B spectrophotometer. The amount of dyestuff in this solution, which is equal to the amount of dyestuff absorbed by the 0.2 gram-sample of polymer is read directly from a curve plotting transmission versus the concentration of dyestuff in N,N-dimethylformamide. By simple proportion, the amount of dyestuff absorbed by the total weight of the polymer is calculated. The percentage of the total amount of available dyestuff that is absorbed by the polymer is calculated by means of the equation:

$$\left[\frac{\text{Amount of dye absorbed}}{\text{Amount of dye originally available in the dyebath}}\right]\times 100=\text{percent}$$

Among the dyestuffs which can be used to dye the polymers of this invention one can mention the Genacryl dyes discussed on pages 432 to 433 of the American Dyestuff Reporter, Volume 43, 1954, for example, Genacryl Red 6B (a basic dye of the quaternary ammonium type), Genacryl Pink G (Basic Red 13; Color Index No. 48015), Genacryl Blue 6G; Celliton Fast Blue AF Ex. Conc. (Disperse Blue 9; Color Index No. 61115); Celliton Fast Red GGA Ex. Conc. (Disperse Red 17; Color Index No. 11210); Fuchsine SBP (a basic dye of the triphenylmethano type); Fuchsine Conc. Basic Violet 14 (Color Index No. 12510); Methyl Violet 2B; Brilliant Blue 6G; Methylene Blue SP; Victoria Green WB (Color Index No. 657); Victoria Green (Basic Green 4; Color Index No. 42000); Rhodamine B (Color Index No. 749); Brilliant Green B (Color Index No. 662); Sevron Brilliant Red 4G; Maxilon Red BL; Basacryl Blue GL; and the like.

The following examples further serve to illustrate the invention but are not intended to limit it in any manner whatsoever since variations thereof within the scope of this disclosure would be readily apparent to one skilled in the art. In the examples, the amounts indicated are in parts by weight, unless otherwise stated. A group of polymerization experiments was also carried out to produce polymers free of furansulfonic acid compounds for control purposes.

*Example I*

A 500 milliliter round-bottomed flask, fitted with a thermometer and stirrer, is charged with 45 grams of acetic anhydride and 150 grams of acetic acid. The solution is cooled to about 10° C., and 19.6 grams of concentrated sulfuric acid is added dropwise thereto while maintaining the temperature at about 10° C. To this solution, a mixture of 33 grams of 2-(alpha-methacryloxymethyl)furan, i.e., furfuryl methacrylate, and 0.3 gram of hydroquinone is rapidly added while the temperature is maintained below in the range of from about −10° C. to about 10° C. In this manner, a solution of 2-(alpha-methacryloxymethyl)furan-ar-sulfonic acid is obtained as a product. To this product, 19.6 grams of potassium acetate are added, and the resulting mixture is allowed to warm to room temperature. A precipitate is formed, and upon filtration, removal of residual acetic acid under reduced pressure, titration with acetone, and refiltration, 14 grams of potassium 2-(alpha-methacryloxymethyl) furan-ar-sulfonate are recovered.

Analysis for sulfur:

| | | |
|---|---|---|
| Calculated | percent | 11.2 |
| Found | do | 11.61 |

Saponification equivalent:

| | |
|---|---|
| Calculated | 284 |
| Found | 273 |

Upon repeating the complete process of this example, substituting an equal weight of additional acetic anhydride for acetic acid during sulfonation, and carrying out the sulfonation at −10° C., 38 grams of potassium 2-(alpha-methacryloxymethyl)furan-ar-sulfonate are obtained. In similar manner, sodium 2-(acryloxymethyl)furan-ar-sulfonate is obtained by the sulfonation of 2-(acryloxymethyl)furan, followed by neutralization with sodium acetate; as is lithium 2-(alpha-chloroacryloxymethyl) furan-ar-sulfonate obtained by the sulfonation of 2-(alpha-chloroacryloxy)furan, followed by neutralization with lithium hydroxide.

*Example II*

To a pyrex polymerization tube there is charged 5 grams of potassium 2-(alpha-methacryloxymethyl)furan-ar-sulfonate, 10 grams of water, 0.1 gram of potassium persulfate and 0.1 gram of sodium bisulfite. The tube is purged with nitrogen, capped, and tumbled in a 50° C. rotating bath for 41 hours. The resulting polymer solution is transferred to a beaker with 10 grams of water and 400 milliliters of acetone are added thereto so as to precipitate the polymer product. Upon separating the polymer by decantation and drying overnight in a 120° C. oven, there are obtained 4.14 grams of solid poly[potassium 2-(alphamethacryloxymethyl)furan-ar-sulfonate]. In similar manner, solid poly[sodium 2-acryloxymethyl) furan-ar-sulfonate] is obtained by the substitution of an equal amount of sodium 2-(acryloxymethyl)-furan-ar-sulfonate for potassium 2-(alpha-methacryloxymethyl)-furan-ar-sulfonate in the process of this example. The polymer products of this example can subsequently be employed, for instance, as ion exchange resins.

*Example III*

To a 1.5 gallon stainless steel autoclave equipped with an agitator and inlet valves, there are charged 240 grams of acrylonitrile, 16 grams of potassium 2-(alpha-methacryloxymethyl)furan-ar-sulfonate, 3200 grams of distilled water, 12 grams of dioctyl sodium sulfosuccinate, 0.0012 gram of ferrous sulfate, and 0.28 gram of 2-mercaptoethanol. The charge is then purged with nitrogen. Thereafter, the autoclave is closed, 544 grams of vinyl chloride are added to the contents therein, and the autoclave is vented. Upon heating and maintaining the charge at a temperature of 50° C., accompanied by agitation, polymerization is initiated by the addition of catalyst to the charge, and during the polymerization, further quantities of the catalyst components, i.e., a total of 2.15 grams of potassium persulfate and 3.32 grams of sulfur dioxide, are added to the charge in an amount sufficient to maintain a polymerization rate of about 4.5 percent conversion per hour. In addition, a mixture of 205 grams of acrylonitrile, 4 grams of potassium 2 - (alpha - methacryloxymethyl)furan-ar-sulfonate, 196 grams of distilled water, 3.1 grams of dioctyl sodium sulfosuccinate, and 0.07 gram of 2-mercaptoethanol are added to the charge at a rate of 43.5 grams per hour. After a polymerization period of 9.5 hours, the contents of the autoclave are discharged, and the resulting polymer product is coagulated with dilute nitric acid. Upon drying the filtered product for about 43 hours in an oven at a temperature of 55° C., there are obtained 443 grams of a terpolymer of vinyl chloride, acrylonitrile and potassium 2-(alpha-methacryloxymethyl)furan-ar-sulfonate, containing 16.6 percent by weight of nitrogen (i.e., 64 percent by weight of polymerized acrylonitrile), 15.9 percent by weight of chlorine (i.e., 28 percent by weight of polymerized vinyl chloride), the remainder being the polymerized furansulfonic acid compound, and having a specific viscosity of 0.328 in N,N-dimethylformamide at a temperature of 30° C. A film of this terpolymer, cast from an N,N-dimethylformamide solution is boiled for 90 minutes in an aqueous dye bath containing 3 percent by weight of Genacryl Pink G and 1 percent by weight of the sodium-sulfate derivative of 7-ethyl-2-methylundecanol-4, based upon the weight of the terpolymer, and having a liquor to film ratio of 40 milliliters per gram. The terpolymer thus absorbs 59 percent of the dye available in the dyebath as compared with an absorption of only 6 percent by weight of a control copolymer containing about 70 percent by weight of polymerized acrylonitrile and about 30 percent by weight of polymerized vinyl chloride. In similar manner, polymers having improved dyeability are obtained by the terpolymerization of acrylonitrile and vinyl chloride with, independently, sodium 2-(acryloxymethyl) furan-ar-sulfonate and lithium 2-(alpha-chloroacryloxymethyl)furan-ar-sulfonate.

What is claimed is:

1. The polymerizable furansulfonic acid compound of the formula:

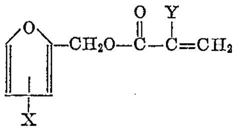

wherein X is selected from the group consisting of $—SO_3H$ and $—SO_3M$, M being an alkali metal atom; and Y is selected from the group consisting of hydrogen, chlorine, and methyl.

2. Potassium 2 - (alpha-methacryloxymethyl)furan-ar-sulfonate.

3. Sodium 2-(acryloxymethyl)furan-ar-sulfonate.

4. Lithium 2 - (alpha - chloroacryloxymethyl)furan-ar-sulfonate.

5. The normally solid homopolymer of a polymerizable furansulfonic acid compound of the formula:

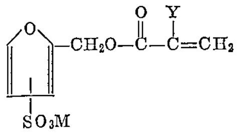

wherein M is an alkali metal atom; and Y is selected from the group consisting of hydrogen, chlorine, and methyl.

6. Normally solid poly[potassium-2-(alpha-methacryloxymethyl)furan-ar-sulfonate].

7. Normally solid poly[sodium - 2 - (acryloxymethyl)-furan-ar-sulfonate].

8. The normally solid polymer comprising from about 35 to about 75 percent by weight of polymerized acrylonitrile, from about 10 to about 60 percent by weight of polymerized vinyl chloride, and from about 0.5 to about 10 percent by weight of at least one polymerized furansulfonic acid compound of the formula:

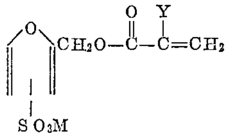

wherein M is an alkali metal atom; and Y is selected from the group consisting of hydrogen, chlorine, and methyl.

9. The normally solid polymer according to claim 8 wherein the furansulfonic acid compound is potassium (2-alpha-methacryloxymethyl)furan-ar-sulfonate.

10. The normally solid polymer according to claim 8 wherein the furansulfonic acid compound is sodium 2-(acryloxymethyl)furan-ar-sulfonate.

11. The normally solid polymer according to claim 8 wherein the furansulfonic acid compound is lithium (2-alpha-chloroacryloxymethyl)furan-ar-sulfonate.

References Cited by the Examiner

UNITED STATES PATENTS

| | | | |
|---|---|---|---|
| 2,402,511 | 6/46 | Thurston | 260—347.2 |
| 2,402,512 | 6/46 | Thurston | 260—347.2 |

JOSEPH L. SCHOFER, *Primary Examiner.*

WILLIAM H. SHORT, *Examiner.*